Dec. 9, 1969 R. H. McMANN, JR 3,483,315
APPARATUS TO IMPROVE COLOR FIDELITY IN SIMULTANEOUS COLOR TELEVISION SYSTEMS
Filed Nov. 28, 1966
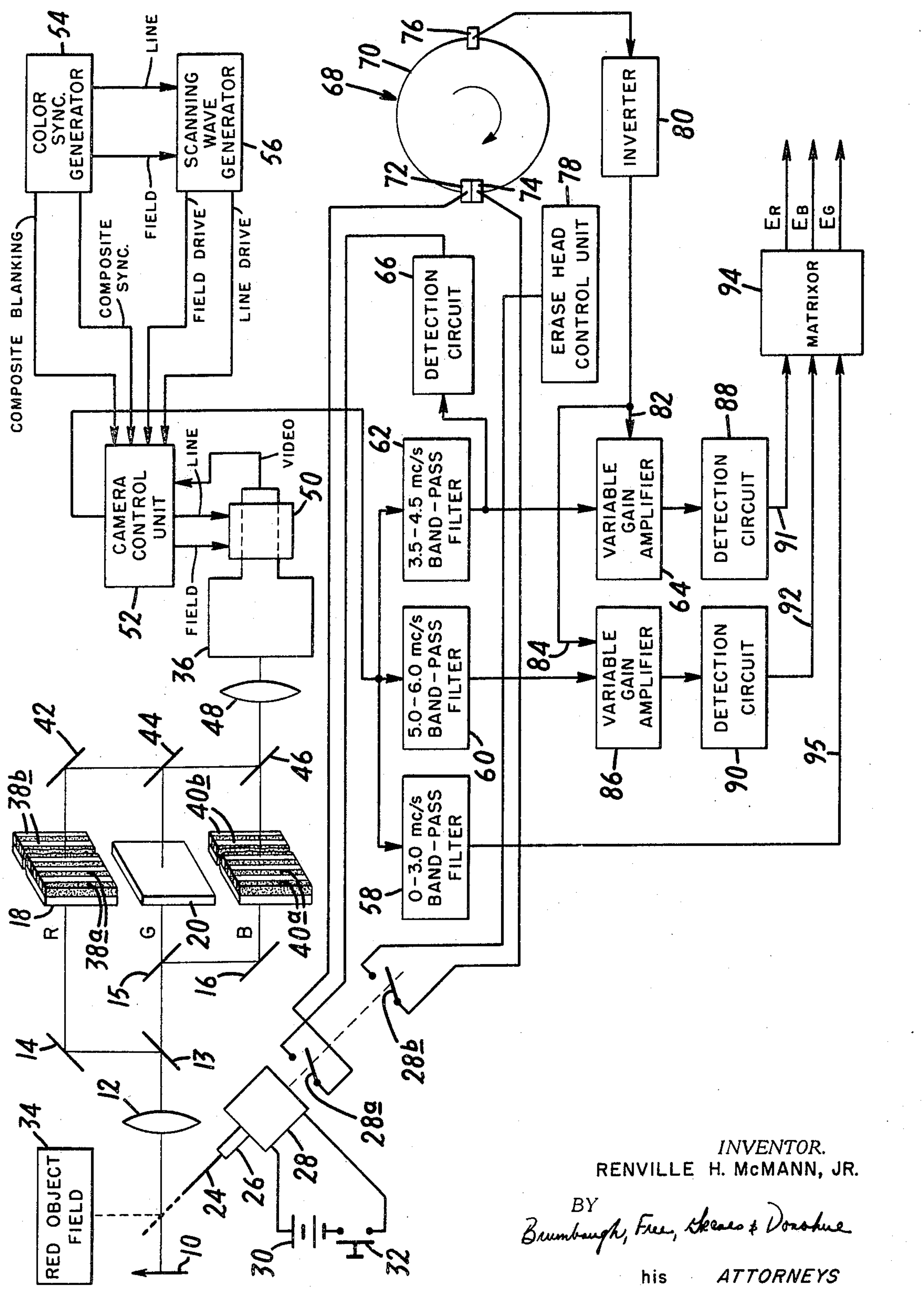
INVENTOR.
RENVILLE H. McMANN, JR.
BY
Brumbaugh, Free, Graves & Donohue
his ATTORNEYS 3,483,315
Patented Dec. 9, 1969

3,483,315

APPARATUS TO IMPROVE COLOR FIDELITY IN SIMULTANEOUS COLOR TELEVISION SYSTEMS

Renville H. McMann, Jr., New Canaan, Conn., assignor to Columbia Broadcasting System, Inc., New York, N.Y., a corporation of New York Filed Nov. 28, 1966, Ser. No. 597,317
Int. Cl. H04n 5/44
U.S. Cl. 178—5.4 12 Claims This invention relates to color television systems and, more particularly, to color television systems which employ singular scanning devices to derive simultaneous color signals.

In most conventional color television systems, three independently operative pick-up devices are employed to simultaneously scan three different color images of an object field. In order to maintain electrical and optical registration between the three pick-up tubes, expensive and complex camera equipment is required. This camera equipment requires a careful maintenance inasmuch as any misregistration between the three pick-up tubes will result in the impairment in the resolution of developed luminance and chrominance signals. This will, in turn cause loss of detail and quality of a picture when reproduced in a color television receiver or a monochrome receiver.

In an attempt to avoid misregistration problems, special pick-up tubes have been devised which are capable of deriving a color field signal containing separable portions corresponding to the three primary color components of the object field. Some television systems which employ such pick-up tubes restrict in equal amounts the effective frequency bandwidths of the green, red and blue portions of the color field signal. Because the eye is most sensitive to the color green, any extensive restriction of its frequency bandwidth will correspondingly cause loss of detail in a picture reproduced in color or monochrome. Other television systems employing singular scanning devices have sought to overcome the above-mentioned loss in detail by allocating a more extensive bandwidth to the portions of the video signal corresponding to the green component of the object field and, correspondingly, restricting the bandwidths of the red and blue portions to smaller values. While this has constituted some improvement, one disadvantage with such systems lies in the fact that the resolution of the pick-up tube deteriorates in the corners so that only an insubstantial amount of red and blue color resolution is provided in the corners of an image reproduced by a color television receiver. Such images contain good brightness and resolution in the central portions thereof but the color green remains predominant in the corners.

Accordingly, it is an object of the present invention to provide a simultaneous color television system which overcomes the above-mentioned disadvantages of the prior art.

It is another object of the present invention to provide a color television system which provides properly proportioned simultaneous signals which will produce uniform color fidelity in a picture reproduced in a color receiver.

These and other objects of the invention are accomplished by initially deriving at least one color video signal containing separable frequency portions, each separable frequency portion corresponding to the same color component of an object field, and thereafter deriving color video signals, each signal containing separable frequency portions which correspond to different color components of an object field. The separable portions of the one color video signal and the subsequently derived color video signals are supplied to a filtering network wherein the separable portions are separated. At least one of the separated separable frequency portions of the one color video signal is recorded for a selected period of time and successively reproduced, the reproduced frequency portions being aligned with the separated frequency portions of the subsequently derived color video signals. After phase inversion of the reproduced frequency portions of the one color video signal, amplifier means are provided to amplify at least one of the separated separable frequency portions of the subsequently derived color video signals in accordance with the magnitude of the inverted reproduced frequency portions. Thereupon, the amplitude compensated separated separable frequency portions are combined with the other separated separable frequency portions of the subsequently derived color video signals to thereby provide simultaneous color signals, each of the signals representing a different color component of the object field.

In the preferred embodiment of the invention, a singular scanning device, together with suitable optical and filtering arrangements, is provided for initially deriving first and second color signals, each signal containing separable frequency portions and each separable portion corresponding to the same color component of an object field, and thereafter deriving color video signals, each signal containing separable frequency portions corresponding to the brightness of the object field and at least two primary color components thereof. The means for recording at least one of the separated separable frequency portions of the first and second color signals preferably comprises storage means, along with record and reproduce transducer means for storing the separated separable frequency portions and successively reproducing the stored portions at a selected time interval to thereby align the stored portions with the separated separable frequency portions of the subsequently derived color signals.

Further objects and advantages of the invention will be apparent from a reading of the following detailed description thereof, taken in conjunction with the accompanying drawing which is a schematic block diagram illustrating the arrangement of one embodiment of the invention.

In a representative color television system according to the present invention, as shown in the drawing, light from an object field 10 is colected by a lens 12 and directed along a first optical path by a conventional semi-reflecting mirror 13 and a conventional front surface miror 14, along a second optical path by the semi-reflecting mirror 13 and a second conventional semi-reflecting mirror 15 and along a third optical path by the semi-reflecting mirrors 13 and 15 and a second front surface mirror 16. The light reflected and transmitted along the three optical paths is then applied to a red filter 18, a green filter 20 and a blue filter 22, respectively. The filters may be of conventional construction and, accordingly, the filter 18 passes only the incident red image light, the filter 20 passes only the incident green image light and the filter 22 passes only the incident blue image light.

Further included in the optical arrangement shown in the drawing is a third front surface mirror 24 which is coupled to the plunger 26 of a conventional solenoid 28. The input terminals of the solenoid 28 are coupled to a battery 30 and to one terminal of a pushbutton switch 32. The solenoid 28 also includes associated contacts **28*a* and 28*b*, shown in their normally open positions, which are actuated to a closed position whenever the solenoid 28 is energized. The depression, preferably momentary, of the pushbutton switch 32 electrically couples the battery 30 across the input terminals of the solenoid 28 and causes the solenoid to energize. Energization of the solenoid 28 causes the actuation of the contacts 28*a* and 28*b* to their closed positions and also causes the plunger 36 to extrude. The surface mirror 24 is urged upwardly by the extruding plunger until it is interposed in the light path between the object field 10 and the lens 12, thereby blocking the path of light from the object field 10 to the lens 12 but reflecting light from a red object field 34**, of any simplified and conventional construction, along the same light path.

Accordingly, light from the red object field 34, rather than light from the field 10, is collected by the lens 12 and directed along the three optical paths defined by the mirrors 13, 14, 15 and 16. Although this light is transmitted along the three optical paths, only the color selective filter 18 transmits the incident light from the field 34. As will be explained in detail hereinbelow, the pushbutton switch 32 is depressed at the start of the scanning cycle to implement the recordation of color video signals which contain information corresponding only to the red object field 34. After these signals are recorded, the pushbutton switch 32 is released to deenergize the solenoid 28. This, in turn, will result in the retraction of the plunger 26 and light from the object field 10 will be collected by the lens 12 instead of the light from the red object field 34.

Attached to the side of the filter 18 exposed to the light sensitive surface of a scanning device 36 preferably of the vidicon type, are black and white vertical strips 38*a* and 38*b*, respectively. The white strips 38*b* are transparent and pass the incident red image light without modification to thereby produce a video signal having frequency portions within a standard 0–3.5 megacycles per second (mc./s.) range when scanning is initiated by the device 36. The black strips 38*a*, on the other hand, are impervious to the incident red image light and are selectively spaced such that a video signal having frequency portions centered around a carrier frequency of 4.0 mc./s. will be produced when scanning is initiated by the device 36. For a line scansion frequency of nominally 15,750 cycles per second (c.p.s.) approximately 844 black strips are spaced along the side of the filter 18 and interposed between a corresponding number of light strips. Inasmuch as the incident red image light is divided in half by the strips 38*a* and 38*b*, the amplitudes of the different frequency signals derived by the device 36 will each be proportional to one-half the intensity of the red image light applied to the filter 18. It is noticeable that when the reflecting mirror 24 is interposed between the object field 10 and the lens 12, the different frequency signals derived by the scanning device 36 will contain information corresponding only to the incident image light of the all red object field 34.

The blue filter 22 is similarly provided with black and white strips 40*a* and 40*b*, respectively, on the side which is exposed to the light sensitive surface of the scanning device 36. The white strips 40*b* are designed to pass the incident blue light of the object field 10 without modification such that a video signal having frequency portions within a standard 0–3.5 mc./s. frequency range and an amplitude proportional to one-half the intensity of the incident blue image light will be produced when scanning is initiated by the device 36. The black strips 40*a* are impervious to the incident blue light of the object field 10 and are selectively spaced such that a video signal having frequency portions centered around a carrier frequency of 5.5 mc./s. will be produced when scanning is initiated by the device 36. To this end, approximately 1,160 black strips are spaced along the filter 22 and interposed between a similar number of white strips for a line scansion frequency of nominally 15,750 c.p.s. Again the amplitude of the derived 5.5 mc./s. will be proportional to one-half the intensity of the incident blue image light. A surface mirror 42 and a pair of half mirrors 44 and 46 are further included and operate to recombine the filtered red, green and blue color images of the object field 10 along the same light path. Of course, when the light from the red object field 34 is collected by the lens 12 and transmitted only by the red filter 18, these mirrors operate to guide the filtered red images along the same light path. The recombined color images or only the red color images are then collected by a lens 48 which focuses the combined color images or the red color images onto the light sensitive surface of the scanning device 36.

The scanning beam in the tube 36 is deflected in the line and field directions by a suitable yoke 50 which is energized with respective sawtooth waves from a camera control unit 52. In the respective arrangement shown, a color synchronizing generator 54 is provided which generates line and field driven pulses of suitable frequency. In a typical arrangement, the field scansion frequency is a nominal 60 fields per second and the line scansion frequency is a nominal 15,750 c.p.s. in order to produce a 525 line doubled-interlaced scanning pattern. The generator 54 also produces composite sync and blanking pulses in accordance with conventional television practice.

The line drive pulses are supplied from the generator 54 through a scanning wave generator 56 to the camera control unit 52, as indicated by the labeled lines. Line deflecting sawtooth waves are produced in the unit 52 and supplied to the deflection yoke 50 of the camera tube 36. Field drive pulses are supplied from the generator 54 by way of the scanning wave generator 56 to the unit 52, as indicated by the labeled lines, and field deflecting sawtooth waves produced in the camera control unit 52 are supplied to the deflection yoke 50.

The color video signals developed by the camera tube 56 are applied to the camera control unit 52 and combined therein with the composite line and field blanking waves from the generator 54. Because of the black strips 38*a* associated with the filter 18, the derived color video signal contains frequency component portions centered around a carrier frequency of 4.0 mc./s. at amplitude levels corresponding to one-half the intensity of the incident red image light of either the object field 10 or the all red object field 34. Because of the white strips 38*b* associated with the filter 18, the derived video signal will further contain frequency component portions occupying a normal 0–3.5 mc./s. video frequency bandwidth. The component portions within this frequency range correspond to one-half the intensity of the red image light of either the object field 10 or the all red object field 34.

Because of the black strips 40*a* associated with the filter 22, the derived color video signal contains frequency component portions centered around a carrier frequency of 5.5 mc./s. at amplitude levels corresponding to one-half the intensity of the incident blue image light of the object field 10. Because of the filter 20 and the white strips 40*b* associated with the filter 22, the derived video signal will further contain frequency component portions occupying the normal 0–3.5 mc./s. video frequency bandwidth. The component portions within this frequency range correspond to the full intensity of the incident green image light and to one-half the intensity of the blue image light of the object field 10. Accordingly, when only the light from the object field 10 is collected by the lens 12, the relationship between the green, red and blue components within the 0–3.5 mc./s. frequency range may be set forth by the following expression.

$$M=G+0.5R+0.5B$$

From the camera control unit 52, the derived color video signal is simultantously applied to 0–3.0 mc./s. bandpass filter 58, a 5.0–6.0 cm./s. bandpass filter 60 and a 3.5–4.5 mc./s. bandpass filter 62. The filters may be of conventional construction and, accordingly, the filter 58 passes all the green, red and blue components of the monochrome portion of the color signal within a 0–3.0 mc./s. frequency range when scanning of the object field 10 is initiated and the red components of the derived color signal within a 0–3.0 mc./s. frequency range when scanning of the object field 34 is initiated. The filter 60 passes all the blue components of the color signal within a 5.0–6.0 mc./s. frequency range and the filter 62 passes all the red components of the derived video signals within a 3.5–4.5 mc./s. frequency range. Although the restriction on the bandwidth of the monochrome signals derived by the device 36 will cause some loss of detail in the reproduced picture, this loss in detail will not be visible to the viewer inasmuch as a 3 mc./s. frequency bandwidth corresponds to a resolution of approximately 315 lines.

In accordance with the invention, the 3.5–4.5 mc./s. bandpass filter 62 is coupled to the input terminals of a variable gain amplifier 64 and a detection circuit 66, respectively. The detection circuit 50, which may be of a conventional type, derives a voltage signal which varies in accordance with the amplitude envelope of the red color component signal and couples this signal to the normally open terminal of the contact 28*a* associated with the solenoid 28, the arm of the contact 28*a* being coupled to a magnetic disc recorder 68. If desired, the circuit 66 may be tuned to operate over a frequency range sufficient to detect representative components of the red color component signals rather than detect the entire amplitude envelope thereof. It is noticeable that only the components of the derived color signals corresponding to a scan of the all red object field 34 will be coupled from the detection circuit 66 to the recorder 68. This is true inasmuch as the energized solenoid 28 controls the positioning of the surface mirror 24 and the actuation of the contact 28*a* so that the contact is closed only when the device 36 is scanning all red color images transmitted by the filter 18.

The magnetic disc recorder 68 is here shown as having a circular disc 70 which rotates adjacent to a suitably placed recording or write head 72, and erase head 74 adjacent the write head 72 and a reproducing or read head 76 spaced 180° from the recording head 72. In the specific arrangement shown, the disc 70 of the recorder 68 is rotated in synchronism with the derived red color video signals so that two red color component signals, odd and even lines, are recorded for each revolution of the disc, a synchronous motor (not shown) being used to drive the disc 70 so that the disc rotates in synchronism with the video signals. It will be understood, however, that other rates of disc rotation not necessarily related to the video signal rate may be used provided that the spacing of the reproducing head 76 from the recording head 72 is properly selected.

While several different tyeps of commercially obtainable storage devices may be used in the present invention, including, for example, magnetic tape systems, ultrasonic glass and quartz delay lines or magnetic film, a disc recorder is preferred. The disc, being rigid, can be easily synchronized with the video signals and the unit reproduces stored information with substantially no distortion. One commercially marketed disc recorder which may be used in the instant invention is the MVR video disc recorder manufactured by Machtronics Inc., which employs a metallic disc having a diameter of 14 inches, a maximum storage capacity of 1600 pictures and operates at a disc speed of 1800 r.p.m.

Accordingly, with the pushbutton switch 32 depressed and the surface mirror 24 interposed between the object field 10 and the lens 12, a detected red voltage signal, scanned in odd lines, is recorded on the rotating disc 70 through the recording head 72 and the appropriate recording electronics during the first one-half a complete revolution. During the next one-half a complete revolution, a detected red voltage signal, scanned in even lines, is recorded on the disc 70 through the recording head 72 and the appropriate recording electronics. The reproducing head 76 is, as mentioned above, displaced 180° from the recording head 56 such that the recorded red voltage signal, scanned in odd lines, is sensed by the reproducing head 60 and amplified by the appropriate reproducing electronics at exactly the same time that the recording head 72 is sensing and recording a second detected red voltage signal scanned in even lines.

The erase head 74 is coupled through the contact 28*b* of the solenoid 28 to an erase head control unit 78 which supplies magnetizing current to the head 74. It can be seen that the control unit 78 supplies this current to the erase head 74 only when the solenoid 28 is energized. Accordingly, as long as the red component signals corresponding to the all red object field 34 are being recorded on the disc 70, the erase head 74 erases any prior information which had been stored on the track being recorded. Although this method of erasing the stored information is known, it should be understood that the recording electronics associated with the recording head 72 may be utilized to effect the appropriate magnetization of the erase head 74. In such an arrangement, the electronics would be adapted to supply the erase head with magnetization current as long as the recording head was sensing and storing video information on the disc 70.

After two detected red color component signals, odd and even lines, are stored on the disc 70, the push-button switch 32 is released in order to deenergize the solenoid 28. With the deenergization of the solenoid 28, the plunger 26 is retracted and light from the object field 10 is collected by the lens 12, the conductive path between the detection circuit 66 and the recording head 72 is opened and the conductive path between the erase head control unit 78 and the erase head 74 is opened. It should be understood that it is not necessary to accurately control the energization of the solenoid 28, provided, of course, that the solenoid is energized for a period of time which will enable the recordation of two red color signals, odd and even lines.

The recorded red color component signals are then continually reproduced by the reproducing head 76, amplified by the reproducing electronics associated with the head 76 and applied through an inverter 80 to the control terminals 82 and 84 of the variable gain amplifier 64 and a variable gain amplifier 86, respectively. Because the disc 70 is rotated in synchronism with the derived color video signals, the reproduced red component signals, even or odd lines, are aligned in time with the different frequency portions of the subsequently derived color signals, even or odd lines. As shown, the input terminals of the amplifiers 64 and 86 are coupled to the band pass filters 62 and 60, respectively. Accordingly, the amplifier 64 amplifies the subsequently derived red color component signals corresponding to one-half the incident red image light of the object field 10 in accordance with the magnitude of the detected and inverted red color gain control signals. Similarly, the amplifier 86 amplifies the blue color component signals corresponding to one-half the incident blue image light of the object field 10 in accordance with the magnitude of the inverted red color gain control signals.

Inversion of the detected and recorded red color gain control signal before applying it to the control terminals of the amplifiers 64 and 86 is preferred inasmuch as the separated red and blue color component signals require amplification in the portions of these signals which correspond to the corners of the scanned image area and require minimal amplification in the portions corresponding to the central lines of the image area. Effectively, this method of bolstering selective portions of the red and blue color signals corresponds to the use of parabolic waveform generators in black-and-white color television systems to brighten the corners of a reproduced image. By inverting the gain control signal, the greatest amount of amplification takes place when the applied red and blue color component signals are at their lowest amplitude levels and the least amount of amplification occurs when the applied red and blue color signals are at their highest amplitude levels.

After the appropriate amplification of the red and blue color component signals, these signals are detected by a pair of detection circuits 88 and 90 which are tuned to operate over frequency ranges of 3.5–4.5 mc./s. and 5.0–6.0 mc./s., respectively. As with the operation of the detection circuits 88 and 90 derive voltage signals which vary in accordance with the amplitude envelope of the amplified red and blue color component signals Thereupon, the red and blue voltage signals are applied through conductors 91 and 92 to a matrixor 94. The output terminal of the filter 58 is also coupled to the matrixor 94 through a conductor 95 such that the filtered monochrome signal is supplied to the matrixor 94. In the matrixor 94 the detected red and blue color voltage signals are combined with the filtered monchrome signal in a suitable manner to yield three simultaneous color signals $E_R$, $F_B$ and $E_G$ which correspond to the red, blue and green incident image light of the object field 10.

In operation, the pushbutton switch 32 is depressed to thereby energize the solenoid 28 and implement the positioning of the mirror 24 between the object field 10 and the lens 12. The scanning device 36, together with the filter 18 and the black and white vertical strips 38*a* and 38*b* operates to derive color signals containing portions within the normal video frequency range and corresponding to one-half the brightness of the incident red image light of the object field 34 and frequency portions within a 3.5–4.5 mc./s. frequency range which correspond to one-half the incident red image light of the object field 34. The high frequency portions of the red component signals are then detected by the detection circuit 66 and recorded on the rotating magnetic disc 70. The pushbutton switch 32 is maintained in a depressed state until at least two fields, odd and even lines, of the red object field 34 are scanned by the scanning device 36. Thereafter, the pushbutton switch is released and the scanning device 36, in conjunction with the filters 18, 20 and 22 and the black and white vertical strips 38*a*, 38*b* and 40*a*, 40*b*, respectively, operates to derive color video signals containing monochrome portions within the normal video frequency range which corresponds to the full brightness of the incident green image light of the object field 10 and one-half the brightness of the incident blue and red image light. Further included within the derived signals are portions within a 3.5–4.5 mc./s. frequency range which correspond to one-half the incident red image light of the object field 10 and portions within a 5.0–6.0 mc./s. frequency range which correspond to one-half the incident blue image light. These frequency portions of the video signal are separated by the bandpass filters 58, 60 and 62, the filtered red and blue color component signals then being applied to the variable gain amplifiers 64 and 86 wherein the signals are amplified in accordance with the magnitude of the recorded red component portions, odd and even lines, of the all red object field 34. Thereafter, the amplified red and blue signals are detected by the detection circuits 88 and 90 and supplied to the matrixor 94. The separated monochrome signals of the subsequently derived color signals are similarly applied to the matrixor 94 and combined therein with the detected red and blue color signals to provide three simultaneous color voltage signals $E_R$, $E_B$ and $E_G$.

It will be understood that the above-described invention is illustrative only and susceptible to considerable modification. For example, the magnetic disc recorder 68 may be equipped with additional write and reproduce heads in order to simultaneously store detected blue component signals along with the red color component signals if the object field 34 comprised an all red and blue light source. This recorded blue color component signal may then be employed to control the gain or the amplifier 86 and/or the gain of the amplifier 64. Also, the object field 34 is not restricted to a light source of one or two primary colors but may comprise a source of white light or any other color known and of uniform intensity. Moreover, the above-described invention is applicable to simultaneous color television systems which employ singular optical paths rather than the three optical paths above described. Accordingly, all such modifications and variations within the skill of the art are included within the spirit and intended scope of the invention as defined by the following claims.

I claim:

1. Apparatus for developing simultaneous color television signals comprising input means for developing at least one color television information signal containing separable portions, each separable portion corresponding to the same color component of an object field, and for thereafter developing color television information signals, each signal containing separable portions corresponding to the different primary color components of another object field, filter means for separating the separable portions of the one color television information signal and the subsequently developed color television information signals, recording means for recording at least one of the separated separable portions of the one color television information signal for a selected period of time to thereby align the separated separable portion with the separated separable portions of each subsequently developed color television information signal, inversion means for inverting the phase of the recorded portion, amplifier means responsive to the recorded portion for compensating the amplitude of at least one of the separated separable portions of each subsequently developed color television information signal in accordance with the magnitude of the inverted recorded portion and combining means for combining the amplitude compensated separated separable portion with the other separated separable portions of each subsequently developed color television information signal to thereby provide simultaneuos color signals corresponding to the different primary color components of the another object field.

2. Apparatus according to claim 1 wherein the input means includes image scanning means for developing at least one color television information signal containing separable frequency portions corresponding to the same color component of the object field and for thereafter developing color television information signals, each signal containing separable frequency portions corresponding to different color components of the another object field.

3. Apparatus according to claim 2 wherein the recording means comprises storage means, recording transducer means for recording at least one of the separated separable frequency portions of the one color television information signal on the storage means and reproducing transducer means for successively reproducing the recorded separated separable frequency portion.

4. Apparatus according to claim 3 wherein the storage means includes movable magnetic disc means and the recording transducer means and reproducing transducer means include magnetic head means spaced along the magnetic disc means in proportion to the rate of motion of the magnetic disc means.

5. Apparatus according to claim 4 wherein the input means comprises image scanning means for developing at least two color television information signals containing separable frequency portions, each portion corresponding to the same color component of the object field and wherein the recording means includes means for recording at least one of the separated separable portions of the two developed color television signals on the storage means to thereby align each of the recorded portions with the separated separable portions of every other subsequently developed color television signal.

6. Apparatus according to claim 5 wherein the image scanning means includes means for developing first color television information signals containing two separable frequency portions, each portion corresponding to one-half the intensity of the incident image light of the singular color component object field, and for thereafter developing second color television signals, each of the signals containing a separable frequency portion corresponding to the brightness of the another object field, a separable frequency component corresponding to one-half the intensity of the blue image light of the another object field and a separable frequency component corresponding to one-half the intensity of the red image light of the another object field.

7. Apparatus according to claim 6 wherein the filter means includes three bandpass filters responsive to the first color television signals for separating each signal into two red color component signals and responsive to the second color television signals for separating each signal into a monochrome signal, a red color component signal and a blue color component signal.

8. Apparatus according to claim 7 including detection means for detecting one of the separated red color component signals of each of the first color television signals and for coupling the detected red component signals to the recording means.

9. Apparatus according to claim 8 wherein the storage means includes means for spacing the magnetic head means along the movable magnetic disc means to thereby align the reproduction of each of the recorded red color component signals with the monochrome signal, the red color component signal and the blue color component signal of every other subsequently developed color television information signal.

10. Apparatus according to claim 9 wherein the amplifier means includes variable amplifier means responsive to the inverted red color component signals of the first television information signals for amplifying the red and blue color component portions of the subsequently developed second color television information signals in accordance with the magnitude of the inverted red color component signals.

11. Apparatus according to claim 10 including further detection means coupled to the variable amplifier means for detecting the amplified red and blue color component signals of the subsequently developed second television information signals.

12. Apparatus according to claim 11 wherein the combining means includes matrixor means for combining the monochrome signal with the detected red and blue color signals to thereby provide three simultaneous voltage signals corresponding to the primary color components of the another object field.

References Cited

UNITED STATES PATENTS

| | | | |
|---|---|---|---|
| 2,907,817 | 10/1959 | Teer | 178—5.4 |
| 3,300,580 | 1/1967 | Takagi et al. | 178—5.4 |
| 3,378,633 | 4/1968 | Macovski | 178—5.4 |

RICHARD MURRAY, Primary Examiner

U.S. Cl. X.R.

178—5.2

PO-1050
(5/69)

UNITED STATES PATENT OFFICE
CERTIFICATE OF CORRECTION

Patent No. 3,483,315 Dated December 9, 1969

Inventor(s) Renville H. McMann, Jr.

It is certified that error appears in the above-identified patent and that said Letters Patent are hereby corrected as shown below:

Column 2, line 44, "colected" should be --collected--;
Column 4, line 10, "driven" should be --drive--;
Column 5, line 48, "tyeps" should be --types--;
Column 6, line 60, after "require" insert --substantial--;
Column 7, line 4, after "detection" insert --circuit 66, the detection--;
line 6, after "signals" insert a period --(.)--;
line 15, "$F_B$" should be --$E_B$--;
line 69, "or" should be --of--;
Column 8, lines 1, 2, "elescribed" should be --described--;
line 68, "ubsequently" should be --subsequently--.

SIGNED AND SEALED
JUL 7 1970

(SEAL)
Attest:

Edward M. Fletcher, Jr.
Attesting Officer

WILLIAM E. SCHUYLER, JR.
Commissioner of Patents